United States Patent

[11] 3,604,189

[72] Inventors Delmar C. Harer
 New Holland;
 Charles B. Adams, New Holland, Pa.; Nigel W. Meek, Long Crendon, England
[21] Appl. No. 859,100
[22] Filed Sept. 18, 1969
[45] Patented Sept. 14, 1971
[73] Assignee Sperry Rand Corporation
 New Holland, Pa.

[54] KNIFE MOUNTING ON A ROTARY MOWER
 11 Claims, 10 Drawing Figs.
[52] U.S. Cl. .................................................. 56/295
[51] Int. Cl. ........................................... A01d 55/18
[50] Field of Search .......................................... 56/295, 255, 25.4

[56] References Cited
 UNITED STATES PATENTS
3,389,539  6/1968  Zweegers .................. 56/25.4 X
3,395,522  8/1968  Zweegers .................. 56/25.4 X
3,507,104  4/1970  Kline et al .................. 56/295
 FOREIGN PATENTS
1,197,180 11/1959 France ........................ 56/255

Primary Examiner—Louis G. Mancene
Assistant Examiner—J. A. Oliff
Attorneys—Joseph A. Brown, John C. Thompson, James J. Kennedy and George C. Bower ABSTRACT: A rotary mower has a plurality of supporting discs longitudinally spaced with cutting knives mounted adjacent to the periphery of the supporting disc. The individual knives have elongated slots fitting over elongated heads spaced from and securely fastened to the discs by cylindrical portions of an attaching bolt and interlock with the attaching bolt when the knives extend to radial cutting positions. Resiliently springs are attached to the supporting discs forwardly of the respective knives in the direction of rotation and have openings fitting over the elongated heads to hold the knife on the cylindrical portions of the attaching bolt as it pivots about the attaching bolt.

PATENTED SEP 14 1971
3,604,189
SHEET 1 OF 2
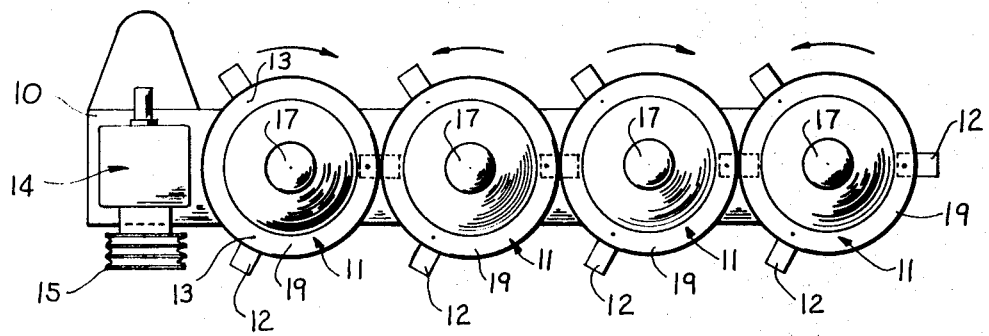
Fig 1
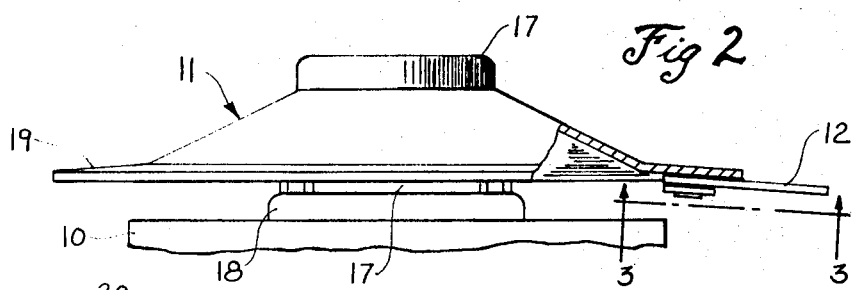
Fig 2
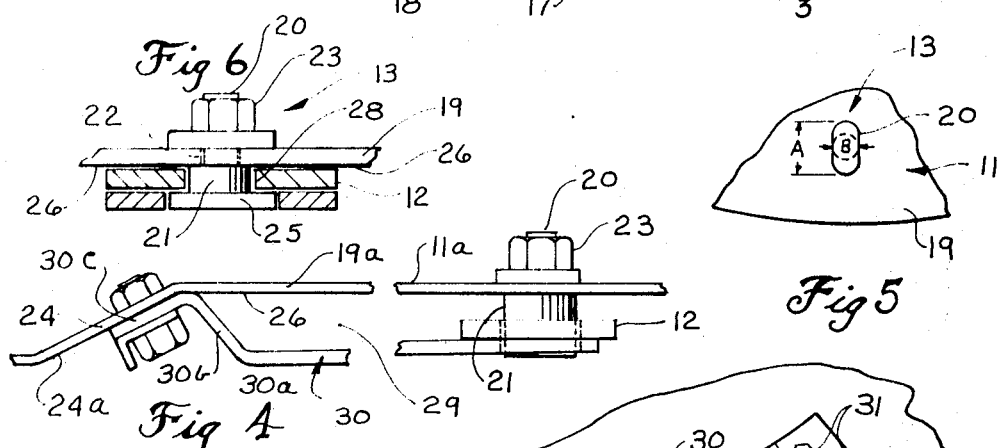
Fig 6
Fig 5
Fig 4
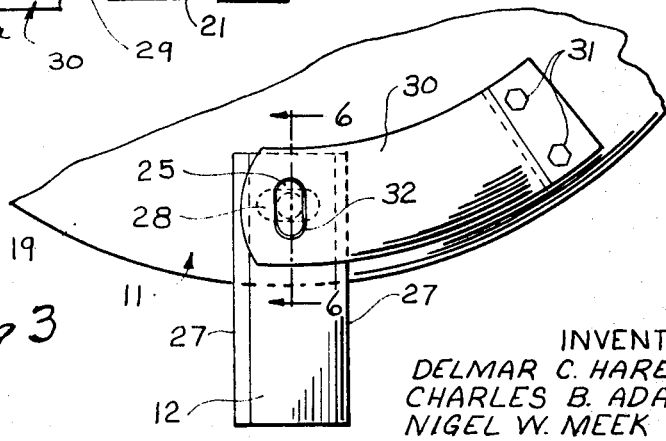
Fig 3
INVENTOR
DELMAR C. HARER
CHARLES B. ADAMS
NIGEL W. MEEK
ATTORNEY
George C. Bower

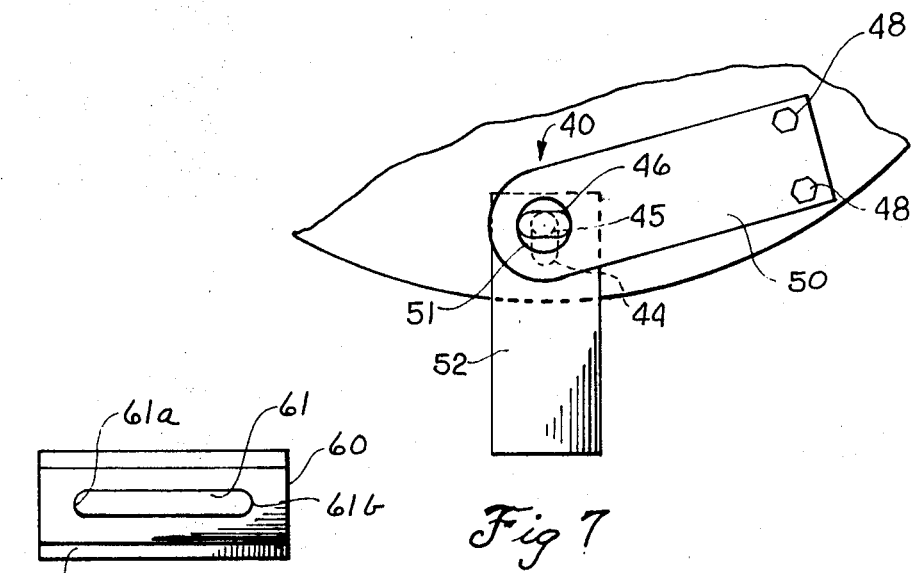
Fig 7
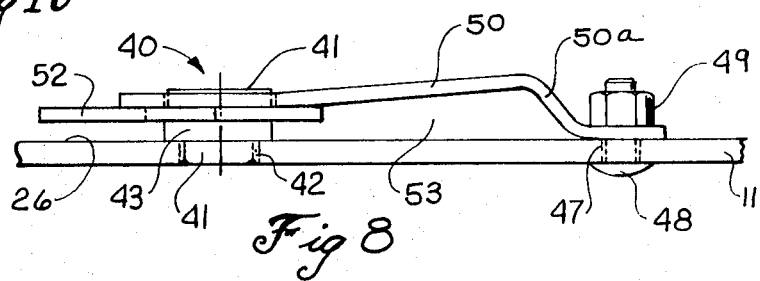
Fig 8
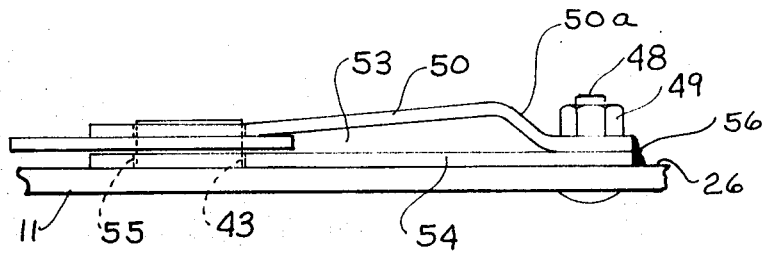
Fig 9
Fig 10
INVENTOR
DELMAR C. HARER
CHARLES B. ADAMS
NIGEL W. MEEK

KNIFE MOUNTING ON A ROTARY MOWER

BACKGROUND OF THE INVENTION

This invention relates to rotary mowers having a plurality of rotatable supports and relates particularly to the means for mounting and holding individual crop-cutting knife blades on the supports.

On one type of rotary mowers there is an elongated casing with supporting means at one end for holding the casing generally parallel to the ground and transverse to the cutting path. In some forms a plurality of disclike supports are rotatably mounted in a row on the casing and rotated by drive means at the supported end through connecting drive means within the casings. Individual cutting knife blades are mounted at circumferentially spaced locations on the supports for cutting crops as the supports rotate.

Previously in these disc-type rotary mowers the cutting knife blades were individually fastened to the support by an attaching means. The attaching means usually has a shank and a elongated head spaced by the shank from the support. The blade has a correspondingly shaped slot which fits over the head when aligned. When on rotation of the disclike support the blade turns radially to the cutting position the slot turns and the blade fits under the elongated head for retention on the disc. A leaf spring is mounted radially inward of the stud and knife blade and extends radially to overlap the knife blade. The leaf spring has an opening fitting over the head to press against the knife blade and hold it on the stud or bolt. The knife blade may pivot on engaging an obstacle such as a rock. The spring holds the blade on the support and permits it to swing back or around to the radial cutting position. It is desirable to further provide improved retaining means for receiving the knife blades to the support such that material accumulations between the retaining means and the support are avoided.

OBJECTS AND SUMMARY OF THE INVENTION

An object of this invention is to provide leaflike spring means for pivotally retaining a knife blade on a rotatable support that cooperates with the ground and crops to retain the knife on the support.

Another object of this invention is to provide a leaf spring retention of a pivotally mounted knife blade that is not separated from the knife-blade-attaching means by accumulated debris.

Another object of this invention is to provide protective means for the leaf spring retaining the knife blade on the attaching means.

Another object of this invention is to provide a knife blade that automatically changes the cutting edge.

In summary this invention comprises the retention of rotary mower knife blade fitting over a shank extending from the rotating mower disc by a resilient leaf-type spring pressing against the knife blade at the stub and attached to the disc forwardly of the knife blade in the direction of rotation so that any engagement with the ground or the like cooperates to force the resilient means against the blade and prevents accumulation of debris underneath the resilient means that causes release of the knife blade.

Other and further objects and advantages will be apparent from the following description and claims taken in connection with the accompanying drawings which illustrate various features of the invention.

BRIEF DESCRIPTION OF THE DRAWINGS

FIG. 1 is a top view of a rotary mower.

FIG. 2 is an end plan view of the rotary mower illustrating a cutting disc partially fragmented to illustrate the mounting of the knife blades on the disc.

FIG. 3 is a fragmentary view of the cutting disc illustrating the leaflike spring means and knife blade in a direction indicated by the arrows 3—3 in FIG. 2.

FIG. 4 is a fragmentary radial edge view of another embodiment of the invention.

FIG. 5 is a fragmentary view of the cutting disc taken in the direction of the arrows 3—3 in FIG. 2 with the leaflike spring and knife blade removed.

FIG. 6 is a sectional view of the knife blade attachment taken along lines 6—6 of FIG. 3.

FIG. 7 is a fragmentary view of the cutting disc in a similar direction indicated by the arrows 3—3 of FIG. 2 illustrating another embodiment of the leaf spring, knife blade and attaching means.

FIG. 8 is a fragmentary radial edge view of a disc illustrating a side view of the embodiment of FIG. 7.

FIG. 9 is a fragmentary radial edge view of the cutting disc illustrating a side view of another embodiment of the knife mounting shown in FIG. 6.

FIG. 10 is a plan view of another embodiment of the knife blade.

DETAILED DESCRIPTION OF THE PREFERRED EMBODIMENT

The rotary mower shown in FIG. 1 generally comprises a housing or casing 10 rotatably supporting four conical disclike supports 11 convexly facing upwardly to slope the disclike supports towards the housing or casing 10. Adjacent the periphery of each one of the supports 11 there are three cutting knife blades 12 pivotally held by attaching means 13, later described herein, and projecting radially outwardly on rotation of the disclike support for cutting crops. At one end a drive means 14 is mounted on the same side of the casing or housing 10 as the cutting disclike supports and has exterior pulley 15 for connecting the drive to a power takeoff or the like (not shown). The rotary mower is pivotally attached to a supporting frame (not shown) for raising the mower to a vertical position clear of the ground or dropping the mower to a generally horizontal position parallel to the ground and transverse to the path of travel of the mower. Adjacent supports rotate in opposite directions as indicated in the arrows of FIG. 1. The blades 12 overlap and pass under adjacent supports and the cutting paths intersect.

In FIG. 2 an end view of the mower is shown illustrating the end conical support 11 and the pivotal attachment of the blade 12 to the support. The support 11 has a hub 17 secured to the rotating means (not shown) supported by the block 18 attached to the housing 10 of the mower. The support may have an edge portion 19 which extends generally parallel to the casing or housing. The knife blades 12 are pivotally attached to this edge portion by attaching means 13. In FIGS. 3, 4, 5 and 6 one embodiment of this attaching means 13 is illustrated and in FIGS. 7-9 another embodiment of the leaf spring means and attaching means to the support is shown.

In FIGS. 3, 5 and 6 the attaching means 13 may comprise a stud 20 and a cylindrical shank 21 with the stud being threaded and fitted through an opening 22 in the edge portion 19 of the support and fastened thereto by a nut 23. The shank is larger in diameter than the stud and projects downwardly from the lower surface of the support 19 and has a elongated member 25 spaced from the surface 26 by the shank 21. The bolt 20 draws the larger against the surface 26. The elongated member 25 may have any shape in which the length A is greater than the width B. Preferably the width B should be substantially equal to the diameter of the cylindrical shank. In this embodiment the elongated member has the larger length A extending radially. The knife blade has an elongated slot 28 of a slightly greater size than the elongated member for mating with or fitting over the elongated member 25. The slot is transverse to the cutting edges 27 and is longitudinally spaced permitting reversal of the knife blade. The slot 28 extends circumferentially in relation to the edge portion 19 when the blade extends radially on rotation of the support. Thus when the knife blade extends radially an overlap occurs between the knife blade 12 and the elongated member 25 so that the elongated member holds the knife blade on the support.

The width of the slot 28 is greater than the diameter of the shank 21 so that the blade readily pivots about the attaching means 16.

A leaf spring 30 is fastened to the support 11 forwardly of the attaching means 13 and blade 12 by fastening means 31 such as bolts. The leaf spring 30 may be curved to follow the contour of the edge of the support 11 and the end of the leaf spring 30 opposite from the fastened end has an opening 32 of the same configuration as the elongated member 25 and of a slightly larger size to readily fit over the elongated member. The leaf spring 30 engages the blade 12 and yieldably presses or urges the blade 12 towards or against the undersurface 26 of the support. The blade readily pivots under this spring pressure in order to deflect rearwardly to the direction of rotation if a rock or other obstacle is engaged by the blade. If the blade 12 should rotate so that the opening in the blade is in registry with the elongated member 25, the spring retains the blade on the disc. Under normal operation the blade will swing to the radial cutting position.

With the leaf spring extending forwardly of the attaching means and knife blade, and in a generally circumferential relation to the rotation of the support, the forward surfaces of the spring will engage any obstacles such as the ground, grass clumps or the like, and press the spring against the blade toward the support ensuring that the blade is retained in an attaching relation with the support.

The leaf spring 30 (FIG. 9) has a raised portion 30a sloped away from the surface 26 to form a space 29 between the leaf spring and the surface 26 for the knife blade 12 to pass. The knife blade can rotate completely around the shank 21. The leaf spring has a portion 30b that slopes sharply towards the support to the portion 30c underneath the fastening means 21.

As shown in FIG. 4 the edge portion 19a of the support 11a may have a bent or crimped portion 24 extending downwardly and positioned forwardly of the leaf spring 30. In FIG. 4 the crimped portion 24 has a sloped surface 24a. The leaf spring 30 has a portion 30c at an angle for attaching the spring to the sloped side 24a. The crimped portion precedes and recesses the leaf spring and mounting for further protection from raising the leaf spring or damage.

In FIG. 7 and 8 another embodiment is illustrated. The stud 41 of the attaching means 40 fits in a peripheral opening 42 in the support and is welded to the support to securely fasten the attaching means to the support. The attaching means has an annular collar 43 extending therearound and engaging the lower surface 26 of the support 11 to space the knife blade 52 from the support. The knife blade has a slot 44 extending longitudinally and radially when the blade is in the cutting position. The ends of the slot are semicircular and have a diameter slightly greater than the shank 45. On the end of the shank 45 is the elongated member 46 extending circumferentially and perpendicular to the slot 44 in the blade when the blade is in the radial position. Elongated member 46 is generally the same configuration as the slot and smaller than the slot to permit the blade to slide over the elongated member to pivot about the cylindrical shank between the elongated member and collar.

The support 11 has two rectangular holes 47 positioned forwardly of the knife blade in the direction of rotation. The bolts bolts extend through the rectangular openings and have rectangular portions at the head which position the bolts in the supports in nonrotatable relation therewith. The nuts 49 are threaded thereon to secure the forward end of the leaf spring 50 to the support. The leaf spring has a circular opening 51 at the opposite end from the secured end of the leaf spring. The opening 51 has a larger diameter than the length of the elongated member 46 so that the leaf spring fits over the elongated member to engage the knife blade.

The knife blade 52 may be mounted on a support 11 by positioning the knife generally circumferential to the support and fitting the elongated slot 44 over the elongated head 46 turning the blade 52 into an interlocked overlapped position. The leaf spring is held above the elongated member to permit the knife blade to slide over and fit on the elongated head. When the knife is over the elongated member the leaf spring can be released and it will press against the knife blade. For removal the leaf spring is lifted clear of the elongated member and the blade turns so that the slot and elongated member are aligned and the blade removed.

The embodiment shown in FIG. 9 is similar to the embodiment of FIGS. 7 and 8 except that a flat metal strip 54 is mounted on a support and secured thereto by nuts 49 and bolts 48. The leaf spring 50 is welded to the strip at 56. The metal strip has a circular opening 55 slightly larger than the collar 43 and fitting therearound to maintain alignment of the leaf spring and the attaching means.

The leaf spring 50 of the embodiments of FIGS. 8 and 9 is also spaced from the support surface 26 or strip 54 by the angled portion 50a at the end fastened to the support to form the space 53 to permit the knife blade to pass through.

In FIG. 10 a modified knife blade 60 is illustrated with a long longitudinal slot 61 with the ends 61a and b spaced so that the blade has the extending end in proper cutting position. The blade will shift in position as it strikes obstacles or as it shifts when the mower is raised and lowered and started and stopped. Thus the blade automatically changes cutting edges without disconnecting the knife blade.

While this invention has been described in connection with a single embodiment, it will be understood that this embodiment is capable of modifications and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A mounting for a mower knife blade comprising a rotatable support, knife-blade-attaching means secured to said support and with a shank and an elongated head spacing said head from said support, said head having length and width extending longitudinally of said support with said length greater than said width, a slot in said knife blade for fitting said blade over said head and having a dimension less than the length of a said head, an elongated leaf spring mounted on said support and pressing against said blade for retaining said blade on said support when said slot and head alignment is characterized by the longitudinal axis of said spring extending in the direction of rotation of said blade and attached to an area of said support located forwardly of said blade and attaching means relative to the direction of rotation of said blade.

2. A mounting as set forth in claim 1 wherein said spring has an opening of substantially the same configuration as said head to fit over said head to engage blade.

3. A mounting as set forth in claim 1 wherein said spring has a circular opening with a diameter greater than the length of said head to fit over said head to engage said blade.

4 A mounting as set forth in claim 1 wherein said head has the length extending radially of the shank.

5. A mounting as set forth in claim 1 wherein said head has the length extending generally circumferentially.

6. A mounting as set forth in claim 1 wherein said support has a raised portion rotationally preceding said spring on the same side of said spring and attaching means.

7. A mounting as set forth in claim 1 wherein said spring is spaced from said support to pass said knife rotating on or about said shank.

8. A mounting as set forth in claim 1 wherein a strip is provided between said spring and said support and secured to said spring and support and having an opening fitting around said attaching means for maintaining the alignment of said spring with said attaching means.

9. A mounting as set forth in claim 6 wherein said raised portion has a sloped surface and said spring is secured to said surface.

10. A mounting as set forth in claim 1 wherein said support is disc shaped and said spring is curved to follow the contour of said support.

11. A mounting as set forth in claim 7 wherein said knife blade has a longitudinally extending slot permitting said knife blade to reverse the cutting position.